United States Patent [19]

Stein et al.

[11] 4,208,214

[45] Jun. 17, 1980

[54] REFRACTORY COMPOSITIONS

[75] Inventors: Joseph L. Stein, Pittsburgh; George A. Russell, Jr., Allison Park, both of Pa.; Gunther L. Mortl, Villach, Austria

[73] Assignee: General Refractories Company, Bala Cynwyd, Pa.

[21] Appl. No.: 898,689

[22] Filed: Apr. 21, 1978

[51] Int. Cl.$^2$ ............................................. C04B 35/52
[52] U.S. Cl. ........................................ 106/56; 106/58; 106/65; 106/66; 106/67; 106/69
[58] Field of Search ................ 106/56, 58, 67, 85, 106/65, 66, 69

[56] References Cited

U.S. PATENT DOCUMENTS

| | | | |
|---|---|---|---|
| 1,624,386 | 4/1927 | Betts | 264/275 |
| 2,937,101 | 5/1960 | Nelson et al. | 106/58 |
| 3,547,664 | 12/1970 | Salazar | 106/67 |
| 3,933,513 | 1/1976 | Mellows | 106/67 |
| 4,048,134 | 9/1977 | Courtenay et al. | 106/58 |
| 4,102,694 | 7/1978 | Sasaki et al. | 106/56 |

*Primary Examiner*—James Poer
*Attorney, Agent, or Firm*—Brian G. Brunsvold; Thomas L. Irving; Everett H. Murray, Jr.

[57] ABSTRACT

Improved carbon-containing, chemically bonded, refractory compositions, usually magnesia or alumina base, including about 1% to 20% by weight carbon and about 0.5% to 10% by weight steel fibers, low carbon steel fibers, or stainless steel fibers of about 10–50 mm in length and about 0.1 mm to about 1.0 mm in diameter of any cross-sectional shape distributed in the carbon-bearing matrix and bonded thereto. Other fibers compatible with both the intended application and the base composition may also be used.

26 Claims, No Drawings

REFRACTORY COMPOSITIONS

BACKGROUND OF THE INVENTION

The prior art has continually sought refractory articles of improved strength for use in conventional steel making processes such as Basic Oxygen Furnace (BOF), Linz Donawitz (LD) and Quality Basic Oxygen Process (Q-BOP). Improvements of refractory articles in the prior art have been made by using magnesite of improved purity and density. For example, the use of magnesite containing low amounts of boron compounds or the adjustment of the silicate phase, so that low melting point minerals are not formed, has improved the high temperature strength of such articles.

Furthermore, the application of internal and/or external metal plates to refractory articles has demonstrated several advantages. The use of such plates is thought to provide a path of thermal conductivity through the article which acts to decrease the thermal gradient and accordingly to lower thermal stresses and reduce thermal shock. In addition, lowering the temperature of the hottest portions of the refractory article thereby reduces the rate of chemical attack. When the plates are used in bricks they also provide mechanical strengthening by joining the ends of the brick in the event of structural failure. The major disadvantage of using metal plates in refractory articles is that they seriously encumber the manufacturing process.

In general, long particles are known to provide a reinforcement network in ceramic articles and refractories which functions to transfer stress. Furthermore, from the science of fracture mechanics, it is known that crack propagation along a "tortuous path" requires higher energy to propagate the crack. Accordingly, refractory materials containing wire and other fibers have a higher fracture toughness.

In the prior art it is known to add fibers, particularly wire or metal fibers, to refractory articles to increase both the strength and service life of such articles. For example, one prior art method describes strengthening of refractory articles by using wires and other fibers in calcium aluminate cement-base refractory castables. Lankard and Sheets, *Use of Steel Wire Fibers in Refractory Castables*, 50 Bull Am. Ceramics Society No. 5 497 (1971).

Furthermore, it is well known in the art to add carbonaceous compounds to refractory compositions and articles. Such materials include coal tar pitch, tar or resins for the purpose of bonding aggregates or impregnating fired refractory brick with carbon. However, it has been discovered that the addition of a specific weight percentage of fibers to a refractory composition having a carbon-bearing matrix results in an unexpected, significant improvement of the service life of the composition or of a refractory article made from the composition. Apparently, this unexpected result is attributable to the fact that the carbon-bearing matrix protects the fibers chemically bonded thereto from oxidation. Therefore, because the strengthening fibers are effective for longer periods of time, refractory articles embodying them retain strength and utility for longer periods of time than non-carbonaceous refractory articles containing fibers.

SUMMARY OF THE INVENTION

The invention is directed to an improved, carbon-containing chemically bonded, fiber-containing aggregate refractory composition. More particularly, the invention is directed to a commercially useful, carbon-containing, fiber-containing magnesite refractory composition particularly useful both in the formation of chemically bonded, unburned refractory brick or shapes and as a refractory specialty product that can be rammed or gunned into place.

For use in the formation of chemically bonded, unburned refractory brick or shapes, the refractory composition comprises a basic aggregate refractory chosen from the group consisting of periclase, dolomite, and dead burned magnesite. Additions to these refractories include fibers of about 10 mm to 40 mm in length and about 0.1 mm to 1.0 mm in diameter and a carbonaceous binder. Preferably, the carbon binder is pitch and the fibers are steel. The fibers are chemically bonded to the carbon matrix.

For maximum strength, service life and endurance, it is also preferable that the refractory composition comprise from about 85% to about 94% by weight periclase containing at least about 95.8% MgO., from about 3% to about 25% by weight pitch, and from about 1% to about 5% by weight steel fibers. Preferably the fibers are of from about 10 mm to 40 mm in length with a maximum cross-sectional dimension of about 1.5 mm, preferably from about 0.1 mm to 1.0 mm.

More preferably, the mixture contains from about 89% by weight to about 92% by weight periclase containing at least about 96% by weight MgO, from about 3% to about 5% by weight steel fibers, about 35 mm in length and about 0.5 mm in diameter with an irregular cross-sectional shape, and about 5.5% by weight pitch.

The improved pitch-containing unburned magnesite refractory brick or shape is made by mixing the preferred weight percentages of fiber, pitch and magnesite. The mixture is then pressed into either a refractory shape or brick and tempered at about 300° F. to 1000° F. for about 10 to about 24 hours in an atmosphere high in pitch volatiles. Preferably, tempering is carried out at about 500° F.

As is to be expected from the knowledge in the prior art, the refractory products of this invention, containing an addition of fibers to a carbon-bearing matrix, exhibit improved resistance to thermal shock when tested in the laboratory compared to conventional refractory shapes containing no fibers. However, unexpectedly, the carbon matrix, to which the fibers are chemically bonded, protects the strengthening fibers from oxidation. Accordingly, the fibers retain their strengthening effectiveness over significantly increased periods of time.

Accordingly, a principal objective of this invention is to provide a pitch-bonded, fiber-containing periclase brick, of improved endurance in the properties of thermal shock resistance and mechanical strength especially for use in areas of steel making vessels where premature failure is most frequent.

Furthermore, it has been discovered that the composition is useful in the refractory art as an unformed or specialty product that can be rammed or gunned into place in application where carbon-containing products are serviceable such as BOF (LD) vessels, electric furnace sidewalls, and blast furnace troughs and runners. The composition can be "dry gunned" with water added at a nozzle and applied as a maintenance coating on wear areas of BOF linings or electric furnace hot spots. Again, because the carbon matrix protects the fibers bonded thereto from oxidation, the specialty product has greater service life than the prior art products.

For use as a specialty product, the refractory composition comprises a refractory aggregate chosen from the group consisting of periclase, dead burned magnesite, dead burned dolomite, chrome ore, alumina, calcined bauxite, mullite, calcined clay, pyrophyllite, and silica. Additions to the refractory composition comprise about 0.5% to 10% by weight fibers from about 12 mm to about 51 mm in length and of a diameter less than about 1.3 mm; and from 1 to 20% carbon chosen generally from the group consisting of carbon black, graphite, pitch powder, pitch, tar, and resins. However, the carbon may be chosen from any combination of materials yielding moderate to high residual carbon.

The fibers in the specialty product are preferably low carbon steel, such as stainless steel of types 304 or 409, but any grade of alloy compatible with the intended application and base composition may be used. In addition, carbon fibers may be used.

This composition is made by mixing the aggregate, fibers and carbon at a temperature of about 380° F. and then allowing the mix to cool to room temperature. The product can be subsequently packaged and marketed in the form of either a dry mix or a moldable ramming mix.

It is understood that the foregoing general description and the following detailed description are only illustrative and exemplary, and that modifications, neither departing from the spirit nor the scope of the present invention, will be obvious to those skilled in the refractory art.

DETAILED DESCRIPTION OF THE INVENTION

For use as a refractory brick or shape, the refractory composition of the present invention comprises a refractory aggregate chosen from the group consisting of periclase, dolomite, dead burned magnesite, synthetic magnesite, alumina, fused alumina and densely sintered alumina; a binder chosen from the group consisting of carbonaceous compounds, phosphate compounds and lignosulfonate compounds; and fibers of about 10 mm to 40 mm in length and about 0.1 mm to 1.0 mm in diameter. The most preferred embodiment of the invention utilizes a carbonaneous compound binder consisting essentially of pitch. This preferred embodiment also utilizes a refractory aggregate that is primarily periclase and fibers of steel.

A more preferred embodiment of this embodiment of the invention is an unburned magnesite refractory brick, formed from a mixture of from about 89% to about 92% by weight periclase containing at least 96%, but more preferably from about 96% to about 99% by weight MgO; from about 3.5% to about 6%, preferably 5.5%, by weight pitch with a minimum softening point of 90° C. (as tested by the cube in air method ASTM #D-2319); and from about 1% to about 8%, more preferably from about 3% to about 5% by weight steel fibers, low carbon steel fibers, or stainless steel fibers which are from 10 to 40 mm in length and from about 0.1 to about 1.0 mm in diameter.

The magnesite, size graded for brick making, includes particles from minus 2 mesh to minus 325 mesh (Tyler). The periclase is usually selected from available synthetic magnesite or periclase which is a dead-burned dense aggregate consisting of grains of crystalline MgO with accessory phases and impurities. Typically, the periclase is used in the compositions as coarses, $-2 +28$ mesh, intermediate, $-28 +200$ mesh, and fines, $-325$ mesh, Tyler screens.

A suitable periclase useful in this invention may have a chemical composition of from about 95% to 99% and above by weight MgO, up to 0.75% by weight $SiO_2$, up to 0.6% by weight $Fe_2O_3$, up to 0.4% by weight $Al_2O_3$, and up to 0.03% by weight $B_2O_3$. An example of this synthetic periclase found useful according to the present invention has a composition of 96.91% MgO, 0.52% $SiO_2$, 0.26% $Fe_2O_3$, 0.15% $Al_2O_3$, 2.13% CaO, and 0.03% $B_2O_3$. Another material that has been found to be suitable for the practice of the invention has a composition of 99.2% MgO, 0.05 $SiO_2$, 0.10 $Fe_2O_3$, 0.03 $Al_2O_3$, 0.55 CaO, 0.002 $B_2O_3$ and 0.07 $Cr_2O_3$. The invention is, however, operable with magnesite having an MgO content of about 90% or above.

Pitches derived from coal tar and petroleum have been used successfully. Resins, pitch powder, and tar may be substituted or added. In addition, the refractory can contain carbonaceous materials in the matrix, as for example fillers such as carbon black or ground, sized graphite.

The fibers preferred in the refractory bricks or shapes may be steel fibers, low carbon steel fibers, or stainless steel fibers. However, other fibers which are compatible with the refractory brick or shape at high temperatures may be used. Particularly, carbon fibers may also be used. Such fibers should comprise from 1% to 5% by weight of the total refractory composition, preferably 2%-3% by weight. The fibers may be from 10 mm to 40 mm in length and preferably from 0.1 to 1.0 mm in diameter with any cross-sectional shape. The maximum cross-sectional dimension of the fibers is about 1.6 mm. Fibers of such dimensions are sufficiently deformed at pressing pressure (5000 to 20,000 psi) to bend around coarse aggregates and thus do not interfere signficantly with particle packing in the refractory body.

A commercially available form of fibers found useful in this invention is low carbon steel fibers essentially 35 mm in length and 0.5 mm in diameter with an irregular cross-sectional shape. Stainless steel types 304 and 446 are useful. Special metals or alloys can be employed depending on compatibility with the brick composition, environment or temperature.

To make the present invention, a refractory batch comprising essentially the preferred percentage weights of magnesite and steel fibers is mixed thoroughly. The mix is then heated to about 360° F. (182° C.).

At this point pitch heated to about 380° F. (193° C.) is introduced into the mix and further mixing occurs until the batch is pressable. Pressing is carried out using standard equipment and in accordance with standard methods commonly employed in the refractories industry. The composition is preferably tempered at 500° F. from about 10 hours to about 24 hours in an atmosphere high in pitch volatiles. However, the brick can be applied without tempering.

Physical properties of compositions containing low carbon steel fibers are shown in the Example below. The Example is not to be construed as a limitation of the invention. Various other compositions, embodiments, modifications and equivalents of these examples will readily suggest themselves to those skilled in the art without departing from the spirit or the scope of the present invention.

Addition of from about 1% to about 8%, preferably 2% to 5% by weight fibers of about 10 mm to 40 mm in length and about 0.1 mm to 1.0 mm in diameter to phosphate bonded high alumina compositions, phosphate bonded basic magnesia or magnesia chrome compositions, or lignosulfonate bonded basic magnesite composition results in refractory compositions within the scope of this invention. All percentages and parts referred to in this Example are by weight unless otherwise indicated. All particle sizes or sieve classifications are Tyler series.

EXAMPLE I

A series of experimental pitch-containing magnesite compositions of approximately 95% MgO were prepared in the laboratory. Analysis of the starting magnesite follows:

MgO—96.0
$SiO_2$—0.65
$Fe_2O_3$—0.3
$Al_2O_3$—0.2
CaO—2.60
$B_2O_3$—0.02

Analysis of the mix compositions (weight %) is shown in Table I.

Table I

| Sieve Classification | Mix | | |
|---|---|---|---|
| | A | B | C |
| Periclase—2 + 6 Mesh | 32.5 | 32.5 | 32.5 |
| −6 + 28 | 37.5 | 37.5 | 37.5 |
| −28 | 10.0 | 10.0 | 10.0 |
| Ball Mill Fines (65% Minimum 325 Mesh) | 20.0 | 20.0 | 20.0 |
| Low Carbon Special Alloy Steel Fiber | 0 | 2 | 5 |

The magnesite, fibers and about 6 weight percent of pitch were blended at a temperature of about 380° F. Subsequently, the mix was pressed at 12,000 psi into 9×4½×3" bricks in a hydraulic press. The bricks were tempered at 550° F. for about 10 to 24 hours and tested for the properties listed in Table II.

TABLE II

| | Pitch Bonded, Tempered Brick | | |
|---|---|---|---|
| | Weight-Percent CC Wireshorts Added | | |
| | 0 | 2 | 5 |
| Bulk Density: | | | |
| g/cm³ | 3.10 | 3.10 | 3.14 |
| lb/ft³ | 193 | 193 | 196 |
| Work of Fracture, J/m² | | | |
| Average | 53.2 | 91.5 | 254 |
| Range | 41.1-60.8 | 69.2-121.5 | 72.3-604 |
| NBT, J/m² | 2.97 | 2.99 | 3.75 |
| R"" WOF/NBT | 18.0 | 30.6 | 67.7 |
| Thermal Diffusivity cm² sec-1 at 300° C. | 0.0033 | | 0.0238 |

In Table II, the fibers used in the refractory were low carbon steel "CC grade wireshorts" obtained from the manufacturer Ribtec. Work of Fracture (WOF) represents the amount of energy required to propagate a crack in the brick. The Notched Beam Technique, abbreviated as NBT, represents the amount of energy required to initiate a crack. R"", a unitless parameter, is a thermal shock resistance index approximately equal to the Work of Fracture (WOF) divided by the Notched Beam Technique (NBT).

The additional following standard abbreviations are used in Table II:

g=gram
cm=centimeter
lb=pound
ft=foot
J=Joule
m=meter
sec=second
C.=centigrade

It can be observed that additions of 2% to 5% steel fibers result in improved performance in the fracture mechanics tests noted above. Especially good performance is achieved when 5% steel fibers were used. Thermal diffusivity, which is proportional to thermal conductivity is improved by approximately a factor of 10. Bricks having internal steel plates were measured to have thermal diffusivity ranging from 0.027 cm² sec-1 to 0.27 cm² to sec-1 at a mean temperature of 225° C. The value for the measured diffusivity depended upon the placement of the temperature measuring probe with relation to the position of the internal plates.

In a panel gradient test, bricks with internal plates and bricks with steel fibers did not develop cracks behind the hot face, while bricks containing no plates or fibers did crack. This is further evidence that the steel fibers increase thermal conductivity and lower thermal stresses and transfer stress from the matrix to the fiber to enable the brick of this invention to withstand more severe conditions in its accustomed use.

The most significant advantage of carbon-bonded brick containing steel fibers is that the improvement in properties due to the inclusion of the fibers in the refractory does not deteriorate significantly with time. This results in dramatic increases in the service life over noncarbon-bonded conventional brick of otherwise the same composition. In addition, when the process of making brick according to the present invention is compared to that of making brick containing internal plates, the brick of the present invention can be produced at much higher pressing rates.

Furthermore, it has been discovered that the refractory composition of the present invention can be used as a refractory specialty product. For such a use, the unburned refractory composition comprises a refractory aggregate chosen from the group consisting of periclase, dead burned magnesite, dead burned dolomite, chrome ore, alumina, calcined bauxite, mullite, calcined clay, pyrophyllite, and silica; about 0.5% to 10% by weight fibers from about 12 mm to about 51 mm in length and of a diameter less than about 1.3 mm; and from 1 to 20% carbon chosen from the group consisting of carbon black, graphite, pitch powder, pitch, tar, and resins. However, the carbon may be chosen from any combination of materials yielding moderate to high residual carbon. Optionally, silicon carbide or other additives used in the art may be included.

The fibers are preferably low carbon steel but carbon fibers may be introduced. Although steel and carbon fibers are preferred, any fibers which are compatible with the refractory aggregate and which increase the strength of the specialty product at high temperatures may be used.

The preferred embodiment for use as a refractory specialty product contains a high basic MgO aggregate, such as periclase, comprised of coarses and fines, 4% low carbon steel fibers from about 12 mm to about 51 mm in length and of a diameter less than about 1.3 mm and 4% flake pitch or graphite. The coarse MgO particles are −4 +10 mesh (Tyler). The fine MgO particles are ground so that 75% are −325 mesh (Tyler). This mix is prepared by thoroughly mixing the aggregate and fibers and heating to about 360° F. (182° C.). At this point, pitch heated to about 380° F. (193° C.) is introduced into the mix. After further mixing, the mix is shaped according to intended application and subsequently packaged.

The composition can be marketed as a moldable ramming mix or as a dry mix which can be mixed with water and "dry gunned" through a nozzle. In either form, the composition is useful in applications where carbon-containing products are serviceable such as BOF (LD) vessels, electric furnace sidewalls and blast furnace troughs and runners. Again, the most significant advantage of carbon-bonded specialty products containing steel fibers is that the improvement of properties due to the inclusion of the fibers in the refractory does not deteriorate significantly with time, resulting in dramatic increases in service life over conventional specialty products. This endurance of properties is attributable to the fact that the carbon matrix, to which the fibers are chemically bonded, protects the fibers (whether the fibers are oxidation prone metals such as steel or oxidation prone materials such as carbon) from oxidation at high temperatures.

What is claimed is:

1. A refractory composition consisting essentially of a basic refractory aggregate chosen from the group consisting of periclase, dolomite, and dead burned magnesite; oxidation-prone fibers of about 10 mm to 40 mm in length and about 0.1 mm to 1.0 mm in diameter; and a carbonaceous binder, said binder forming throughout said composition a carbon matrix to which said fibers are chemically bonded.

2. The composition of claim 1 wherein said fibers comprise from about 1% to about 5% by weight of said composition.

3. The composition of claim 1 wherein said fibers are low carbon steel.

4. The composition of claim 1 wherein said fibers are stainless steel.

5. The composition of claim 4 wherein said stainless steel is type 304 stainless steel.

6. The composition of claim 1 wherein said fibers have a maximum cross sectional dimension of about 1.6 mm.

7. The composition of claim 1 wherein said fibers comprise from about 2 to 3% by weight of said composition.

8. The composition of claim 1 consisting essentially of from about 85% to about 94% by weight refractory aggregate, and from about 1% to about 5% by weight steel fibers.

9. The composition of claim 8 comprising from about 3.5% to about 25% by weight carbonaceous binder.

10. The composition of claim 9 wherein said binder is chosen from the group consisting of pitch, tar, and resins.

11. The composition of claim 1 consisting essentially of from about 89% to about 92% by weight aggregate, from about 3% to 5% by weight fibers of about 35 mm in length and about 0.5 mm diameter, and about 5.5% by weight binder.

12. The composition of claim 11 wherein said binder is pitch.

13. The composition of claim 1 wherein said carbonaceous binder is pitch with a minimum softening point of 90° C.

14. A refractory composition comprising a magnesite aggregate, steel fibers of from about 10 mm to 40 mm in length, and about 0.1 mm to 1.0 mm in diameter, and a phosphate binder, said binder forming throughout said composition a phosphate matrix to which said fibers are chemically bonded.

15. A refractory composition comprising a magnesite aggregate, a lignosulfonate binder, and steel fibers of about 10 mm to 40 mm in length and about 0.1 mm to 1.0 mm in diameter.

16. A refractory composition comprising an alumina aggregate, steel fibers of from about 10 mm to 40 mm in length and about 0.1 mm to 1.0 mm in diameter, and a phosphate binder, said binder forming throughout said composition a phosphate matrix to which said fibers are chemically bonded.

17. An unburned refractory brick consisting essentially of a basic refractory aggregate chosen from the group consisting of periclase, dolomite, and dead burned magnesite; and steel fibers of about 10 mm to 40 mm in length and about 0.1 mm to 1.0 mm in diameter; and a carbonaceous binder, said binder forming throughout said composition a carbon matrix to which said fibers are chemically bonded.

18. The brick of claim 17 consisting essentially of from about 85% to about 94% by weight refractory aggregate, from about 1% to about 5% by weight steel fibers, and from about 3.5% to about 6% by weight carbonaceous binder.

19. The brick of claim 17 consisting essentially of from about 89% to about 92% by weight aggregate, from about 3% to 5% by weight steel fibers of about 35 mm in length and about 0.5 mm diameter, and about 5.5% by weight binder.

20. A refractory composition consisting essentially of a refractory aggregate chosen from the group consisting of periclase, dead burned magnesite, dead burned dolomite, chrome ore, alumina, calcined bauxite, mullite, calcined clay, pyrophyllite, and silica; about 0.5% to 10% by weight oxidation-prone fibers from about 12 mm to about 51 mm in length and of a diameter less than about 1.3 mm; and from about 1% to 20% carbon, said carbon derived from at least one carbon source yielding moderate to high residual carbon chosen from the group consisting of carbon black, graphite, pitch, tar, and resins and said residual carbon further forming throughout said composition a carbon matrix to which said fibers are chemically bonded.

21. The composition of claim 20 wherein the fibers are low carbon steel.

22. The composition of claim 20 wherein the fibers are carbon.

23. A refractory mix suitable for ramming consisting essentially of a refractory aggregate chosen from the group consisting of periclase, dead burned magnesite, dead burned dolomite, chrome ore, alumina, calcined bauxite, mullite, calcined clay, pyrophyllite, and silica; about 0.5% to 10% by weight oxidation-prone fibers from about 12 mm to about 51 mm in length and of a diameter less than about 1.3 mm; and from about 1% to 20% carbon, said carbon derived from at least one carbon source yielding moderate to high residual carbon chosen from the group consisting of carbon black, graphite, pitch, tar, resins and said residual carbon further forming throughout said composition a carbon matrix to which said fibers are chemically bonded.

24. A refractory mix suitable for gunning consisting essentially of a refractory aggregate chosen from the group consisting of periclase, dead burned magnesite, dead burned dolomite, chrome ore, alumina, calcined bauxite, mullite, calcined clay, pyrophyllite, and silica; about 0.5% to 10% by weight oxidation-prone fibers from about 12 mm to about 51 mm in length and of a diameter less than about 1.3 mm; and from about 1% to 20% carbon, said carbon derived from at least one carbon source yielding moderate to high residual carbon chosen from the group consisting of carbon black, graphite, pitch, tar, and resins and said residual carbon further forming throughout said composition a carbon matrix to which said fibers are chemically bonded.

25. The composition of claims 1, 20, 23 or 24 wherein said oxidation-prone fibers are metal.

26. The composition of claim 1, 20, 23 or 24 wherein said oxidation-prone fibers are carbon.

* * * * *